Dec. 6, 1938.                L. GITZENDANNER                2,138,852
                          THERMOSTATIC MIXING VALVE
                            Filed Feb. 13, 1937
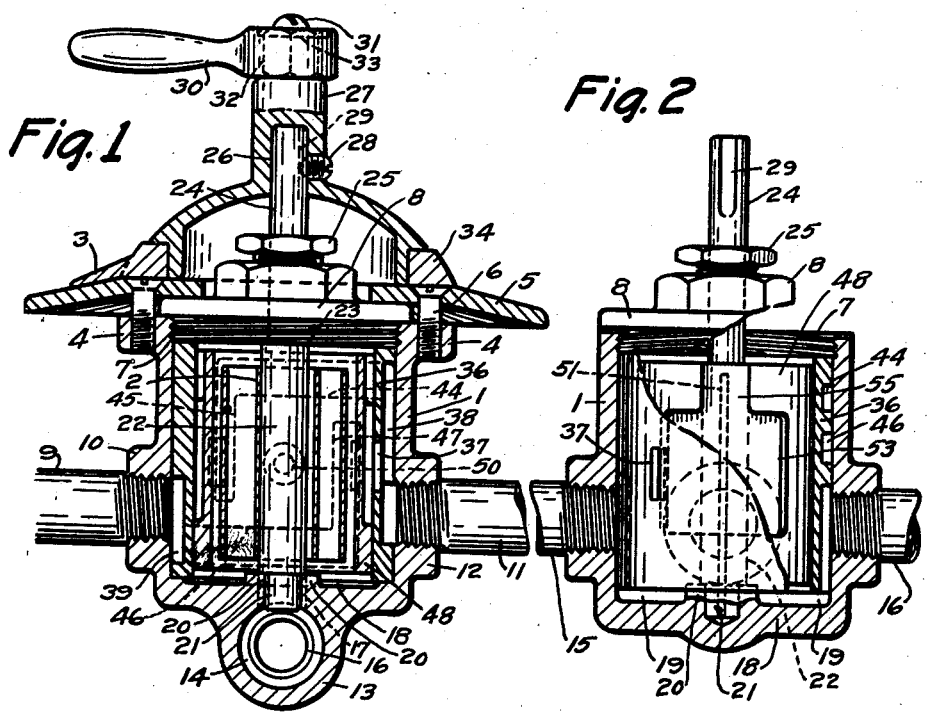
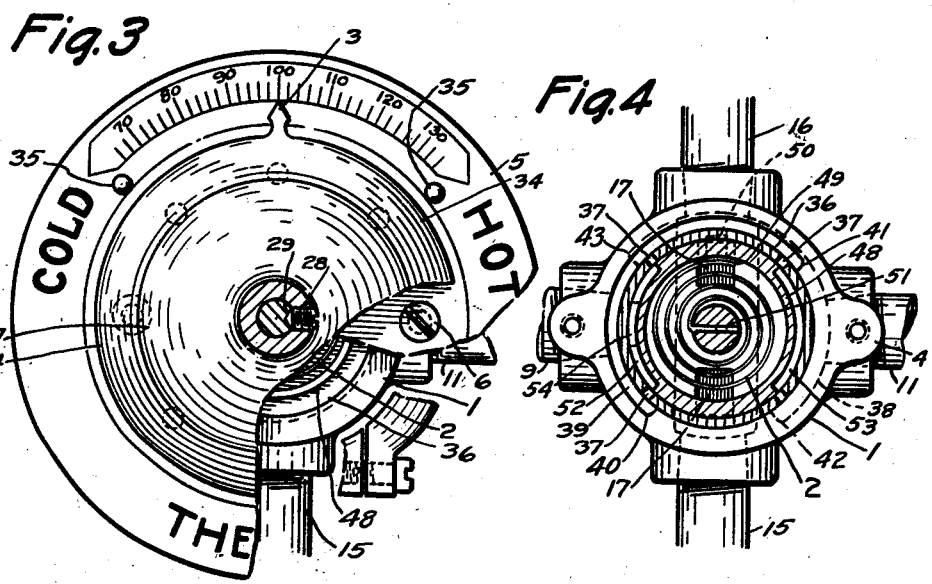
INVENTOR
Louis Gitzendanner
BY
James Harrison Bowen
ATTORNEY Patented Dec. 6, 1938

2,138,852

UNITED STATES PATENT OFFICE 2,138,852

THERMOSTATIC MIXING VALVE

Louis Gitzendanner, Richmond Hill, N. Y.

Application February 13, 1937, Serial No. 125,591

2 Claims. (Cl. 236—12)

The purpose of this invention is to provide a simple, efficient and compact valve that may be set to a predetermined degree and which will proportionately mix hot and cold water passing therein to provide water of the temperature desired.

The invention is a thermostatic mixing valve having a balanced control sleeve attached to a thermostatic element, in which the element may be set from the exterior and which will automatically operate to produce water at any given temperature.

Other devices of this nature have been provided having elements operated by thermostatic material, however, these devices have not provided means for balancing the valve member, and as the movement of the thermostatic element is very delicate, it is necessary that the member moved thereby must move with very little effort. These devices have also been comparatively large and, therefore, objectionable and have also been comparatively costly so that they have not been adapted universally. Many other devices have been provided that are mechanically operated, however, in any of these devices it is impossible to obtain water at a given temperature when the temperatures of the hot and cold water supplies vary.

The object of this invention is, therefore, to provide a simple, inexpensive and compact valve that operates with a high degree of accuracy and that will produce water at a given temperature regardless of variations in the temperatures of the hot and cold water supplies.

Another object is to provide a thermostatic mixing valve which may readily be installed in a wall, fixture, or in combination with any device.

Another object is to provide a thermostatic mixing valve in which the parts thereof may readily be removed and replaced.

A further object is to provide a thermostatic mixing valve in which the wearing parts are reduced to a minimum.

And a still further object is to provide a thermostatic mixing valve which is of a simple and economical construction.

With these ends in view the invention embodies a valve casing having hot and cold water inlet connections at the sides, an outlet connection or connections, a stationary sleeve with a recess in the valve casing around the outside of the sleeve, a movable sleeve inside of the stationary sleeve and also having recesses therein, a thermostatic element connected to the movable sleeve and also connected to a centrally positioned rod, and a pointer at the end of the rod and on the outside of the casing adapted to be set to different points indicating temperatures.

Other features and advantages of the invention will appear from the following description taken in connection with the drawing, wherein:

Figure 1 is a vertical section through the valve with parts broken away.

Figure 2 is a similar section taken at right angles to the section shown in Figure 1 having some of the interior members shown in full lines and with parts thereof broken away.

Figure 3 is a plan view with parts broken away.

Figure 4 is a plan view of an alternate design showing the upper end of the casing with the upper parts removed, and showing the water inlet recesses in the inner surface of the casing instead of in the sleeve.

In the drawing the device is shown as it would be made, wherein numeral 1 indicates the casing, numeral 2 the thermostatic element, and numeral 3 the pointer.

The valve casing 1 is preferably made cylindrical, however, it will be understood that it may be made of any shape or of any size, and arranged in any manner. In the design shown, the upper end is provided with lugs 4 to which a dial disc 5 may be attached by screws 6 and the interior is provided with threads 7 into which a cover 8 may be threaded, as shown. The dial 5 may be provided with a plurality of holes for the screws 6 to permit adjusting the positions thereof in relation to the casing, if desired. In the lower part of the casing, and at opposite sides thereof, are hot and cold water inlet connections, the hot water connection being provided by a pipe 9 which is threaded into a boss 10, and the cold water connection provided by a pipe 11 that is threaded into a boss 12. It will be understood, however, that these connections may be reversed or located at right angles, or at any points. The outlet connection or connections may be made from the lower end of the casing, as shown in Figure 1, or from the sides thereof, as shown in Figure 2. In the design shown in Figure 1, the casing is formed with a continuous boss 13 having an opening 14 therein, and outlet connections 15 and 16 are provided from the ends thereof, however, it will be understood that only one connection may be provided and also that any number of outlet connections may be provided. The opening 14 may communicate with the interior of the upper part of the casing, through openings 17 in the base 18 thereof, and in the design shown in Figure 2 in which the connections 15 and 16 are formed in the same plane as the connections 9 and 11, the casing is provided with communicating openings 19 from the lower end to these connections. In the center of the member 19 is a boss 20, in which the lower end 21 of a centrally located rod 22 may be pivotally mounted, as shown in Figure 1. The upper end of this rod is turned down at the point 23, forming a shoulder, and the upper end 24 extends upward through a packing gland 25 in the cover 8 and also extends into an opening 26 in a cap 27 and the cap 27 is provided with a setscrew 28 that extends into a slot 29 in the upper end of the rod. It will, therefore, be noted that as the cap 27 is rotated, it will rotate the shaft and as the inner end of the thermostatic element 2 is connected to the shaft, the element may be set by turning the shaft and cap. The upper end of the cap 27 may be provided with a handle 30 which may be held by a screw 31, and this handle fits over a square shank 32 on the cap, and may be located in any position. A washer 33 may be provided under the screw 31, and counter-sunk in the handle or placed thereon. The cap 27 is clamped in a ring 34, as shown in Figure 3, which is slidable on the upper surface of the plate 5 and the pointer 3 extends from one side of the ring 34, as shown in Figure 3. The plate 5 may be provided with graduations which may be arranged as shown in Figure 3, or which may be located at any point or points, or which may be continuous. It will also be understood that any number of graduations may be provided and any number of degrees desired may be indicated therein. Stops 35 may be provided at the ends of the graduations to limit the movement of the pointer.

On the interior of the casing 1 is a stationary sleeve 36, having rectangular shaped openings 37 therein, which are preferably located at 90 degree angles to each other, as shown in Figure 4, however, one of these openings is shown corresponding with one of the inlet connections, in Figure 1, for the purpose of illustrating that the opening extends thru the wall of the stationary sleeve. These openings may, however, be located at any other point or points and may be of any shape. The outer surface of the wall of the sleeve 36 is provided with recesses 38 and 39, so that water entering the casing may substantially surround the exterior of the sleeve. In the design shown in Figure 4, the recesses are shown in the inner surface of the casing instead of in the sleeve, and the recess 39 which is shown in full lines extends from a point 40 to a point 41, so that it will correspond with two of the openings 37 in the stationary sleeve 36, and the recess 38 which is shown in dotted lines in Figure 4, extends from a point 42 to a point 43, thereby overlapping the recess 39 but not coming in contact therewith, and this recess 38 corresponds with the two opposite openings 37, as shown. The position of these recesses in Figures 1 and 2 is the same as in Figure 4 except that they are formed in the sleeve instead of in the casing. The overlapping parts of these recesses are indicated in dotted lines in Figure 1, in which it will be noted that the recess 38 extends upward over the upper part of the valve through a horizontal section 44 and then downward through a vertical section 45, and the recess 39 extends over the lower part of the valve with a straight section 46 and a vertical section 47. The vertical sections 45 and 47 communicating with their respective inlet connections and also corresponding with the openings 37 in the stationary sleeve 36.

Inside of the stationary sleeve 36 is a movable sleeve 48 forming the valve member and one end 49 of the thermostatic element 2 is attached to this member by a pin 50, as shown in Figures 1 and 4, and the opposite end of the member 2 is held in a slot 51 in the shaft 22, and it will be noted that the member 48 may readily be set to any position by turning the shaft 22 and the temperature of the member 2 will adjust the position of the member 48. The member 48 is provided with recesses 52 and 53, as shown in Figures 2 and 4, and the upper ends of these recesses are provided with recessed openings 54 and 55, which communicate with the interior of the valve thru the upper end of the member 48 and, therefore, water from one of the inlet connections passing into the recess in the casing 1, thru the openings 37, and into one of recesses 53, may then pass upward thru one of the openings 55 and into the interior of the valve. The water will then pass downward around the thermostatic element, and thru the openings 17 and 18, into the lower part of the valve, and then pass out one or both of the outlet connections. It will be understood that the relative positions of the recesses in the valve casing and valve member, and the position of the openings 37 may be set or adjusted so that any amount of fluid may pass into the interior of the valve, and this amount may be regulated by the relative positions of these recesses and openings. The valve may be closed by turning the valve member so that the recesses 52 and 53 do not register with the openings 37 and the amount of water passing into the valve may, therefore, be controlled by the edges of the recesses 52 and 53, registering or partly registering with the openings 37. The recesses 52 and 53 are of a sufficient size to permit enough water or fluid to flow around the exterior of the valve member 48 to correspond with the pressure on the interior so that this member is accurately balanced so that it is free to turn and it may, therefore, be moved by the thermostatic element with a high degree of accuracy which makes it possible to obtain substantially any mixture of the hot and cold waters that may be desired to obtain water at any given temperature.

It will be understood that other changes may be made in the construction without departing from the spirit of the invention. One of which changes may be in the use of other means for adjusting the position of the thermostatic element, another may be in the use of other means for forming the openings 37 in the valve casing, another may be in the use of other means for admitting the water around the exterior of the valve member in order to balance this member, and still another may be in the use of other means for forming a closure at the upper end of the casing.

The construction will be readily understood from the foregoing description. In use the valve member may be provided as shown and it will be noted that with the interior parts in place, the cover 8 may be screwed in the upper end of the casing with a flange thereon fitting snug on the upper end of the casing or a gasket may be provided below the flange, as shown in Figure 2, and the interior of the nut may be sealed by the packing gland 25 which may be screwed therein. The upper part of the valve may then be placed over the upper end of the shaft so that the valve is ready to be installed and the connections 9 and 11 may be attached to any suitable source of hot and cold water supply. An outlet connection of any type may then be provided at the lower end of the valve, and this may be taken to any point or points, as may be desired.

When it is desired to obtain water of any given temperature, the pointer 3 may be set to that temperature on the dial 5, and the valve will be immediately opened so that hot and cold water may flow therethrough, and as the mixture passes over the thermostatic element, it will continue to adjust the sleeve 48 until the temperature of the mixture corresponds with that to which the pointer is set. It will, therefore, be understood that a mixture of any temperature desired may be obtained even though the temperatures of the hot and cold water supplies may vary.

Having thus fully described the invention what I claim as new and desire to secure by Letters Patent is:

1. In a mixing valve, a casing having inlet and outlet connections, a movable sleeve freely mounted in said casing, said sleeve having recesses in the exterior extending over a substantial portion thereof and opening to the mixing chamber through the upper end of the sleeve, a thermostatic element attached to and adapted to rotate said sleeve, said device having openings adapted to register with said recesses to regulate the amounts of fluid entering said valve from the inlet connections, and means adjusting the position of said thermostatic element to control the position of said sleeve to control the fluids entering the interior of said valve to regulate the desired temperature of the mixed fluids.

2. A mixing valve, as described in claim 1, characterized in that additional confined recesses are formed in the casing which extend over a substantial part of the interior thereof and the openings provide communicating means between the recesses in the casing and the recesses in the said movable sleeve.

LOUIS GITZENDANNER.